(12) United States Patent
Gong et al.

(10) Patent No.: US 8,426,058 B2
(45) Date of Patent: Apr. 23, 2013

(54) METAL-RESIN COMPOSITE AND METHOD

(75) Inventors: Qing Gong, Shenzhen (CN); Liang Zhou, Shenzhen (CN); Xinkun Lv, Shenzhen (CN)

(73) Assignee: BYD Co. Ltd., Shenzhen (CN)

( * ) Notice: Subject to any disclaimer, the term of this patent is extended or adjusted under 35 U.S.C. 154(b) by 414 days.

(21) Appl. No.: 12/816,907

(22) Filed: Jun. 16, 2010

(65) Prior Publication Data

US 2010/0330413 A1 Dec. 30, 2010

(30) Foreign Application Priority Data

Jun. 26, 2009 (CN) .......................... 2009 1 0108471

(51) Int. Cl.
| | |
|---|---|
| *H01M 2/00* | (2006.01) |
| *H01M 2/08* | (2006.01) |
| *H01M 2/04* | (2006.01) |
| *H01M 2/02* | (2006.01) |
| *B32B 3/00* | (2006.01) |
| *B44C 1/22* | (2006.01) |

(52) U.S. Cl.
USPC ........... 429/163; 429/175; 429/176; 429/177; 428/172; 428/173; 216/37

(58) Field of Classification Search .................. 429/163, 429/175–177; 428/172, 173; 216/37
See application file for complete search history.

(56) References Cited

U.S. PATENT DOCUMENTS

| | | | | |
|---|---|---|---|---|
| 3,622,376 | A * | 11/1971 | Tieszen et al. | 428/419 |
| 4,396,658 | A * | 8/1983 | Mettes et al. | 428/35.8 |
| 5,288,535 | A | 2/1994 | Kanbara et al. | |
| 2002/0048685 | A1 | 4/2002 | Bishop et al. | |
| 2005/0112461 | A1 | 5/2005 | Amine et al. | |
| 2006/0257624 | A1* | 11/2006 | Naritomi et al. | 428/141 |
| 2007/0117911 | A1* | 5/2007 | Irwin et al. | 524/495 |

FOREIGN PATENT DOCUMENTS

| | | |
|---|---|---|
| CN | 200380102886.0 | 11/2003 |
| CN | 200680043789.2 | 10/2006 |

* cited by examiner

*Primary Examiner* — Carlos Barcena

(74) *Attorney, Agent, or Firm* — Brinks Hofer Gilson & Lione

(57) ABSTRACT

A metal-resin composite comprises a metal substrate with concavities in the surface, a first coating layer on the surface of the metal substrate, a second coating layer on the first coating layer, and a third coating layer on the second coating layer. The first coating layer fills the concavities and covers the surface of the substrate.

17 Claims, 2 Drawing Sheets

METAL-RESIN COMPOSITE AND METHOD

CROSS-REFERENCE TO RELATED APPLICATION

This application claims priority to Chinese Patent Application No. 200910108471.3 filed on Jun. 26, 2009, the entirety of which is incorporated by reference.

FIELD OF THE DISCLOSURE

The disclosure relates to a metal-resin composite, particularly to a composite of a metal and a polyphenylene sulfide resin, and a method for preparing the same.

BACKGROUND OF THE DISCLOSURE

Lithium ion batteries are widely used in the electric industry, information technology industry, and other fields. The lithium ion batteries have numerous advantages, such as high voltages, high capacities, no memory effects, low pollutions, small volumes, high specific energy, small resistances, low self-discharge, high-cycle life, safe, and adjustable shapes.

Lithium ion batteries require that a battery core containing an electrolyte solution is placed in a sealed shell. Typically, the sealing material of the shell is metal-rubber composites. The electrolyte solution may leak from the sealed shell after the battery is recharged for certain times.

One example in the prior art discloses a metal-resin composite. The composite comprises: (1) a magnesium alloy; (2) a layer having a metal oxide, a metal carbonate, or a metal phosphate on the surface of the magnesium alloy; and (3) a resin layer. The main component of the resin layer is a polybutylene terephthalate resin or a polyphenylene sulfide resin, a thermoplastic resin with crystalline property. The resin is introduced into concavities of the surface of the alloy by an injection molding process.

Another example in the prior art discloses a method of manufacturing a composite of an aluminum alloy and a resin. The method comprises the steps of: immersing the aluminum alloy into at least one selected from the group consisting of ammonia solutions, hydrazine solutions and water-soluble amide compounds; and applying a polyphenylene sulfide resin into the alloy by an injection molding method. The method requires complex steps.

SUMMARY OF THE DISCLOSURE

In one aspect, a metal-resin composite comprises a metal substrate with concavities in the surface, a first coating layer on the surface of the metal substrate, a second coating layer on the first coating layer, and a third coating layer on the second coating layer. The first coating layer fills the concavities and covers the surface of the substrate.

In another aspect, a method for preparing a metal-resin composite comprises the steps of: etching the surface of a metal substrate; preparing a slurry; applying the slurry on the surface of the metal substrate; calcining the metal substrate to form a first precast composite; preparing a mixture; applying the mixture onto the first precast composite; calcining the first precast composite to form a second precast composite; and applying a polymer selecting from the group consisting of polyphenylene sulfide resins, tetrafluoroethene-perfluoroalkyl vinyl ether copolymers, and combinations thereof onto the second precast composite by an injection molding process to form a metal-resin composite.

In yet another aspect, a battery comprises a shell, a core displaced in the shell, an electrolyte; and a cover plate. The cover plate closes and seals the shell. The cover plate comprise a metal-resin composite. The metal-resin composite comprises a metal substrate with concavities in the surface, a first coating layer on the surface of the metal substrate, a second coating layer on the first coating layer, and a third coating layer on the second coating layer. The first coating layer fills the concavities and covers the surface of the substrate.

Figure 1:
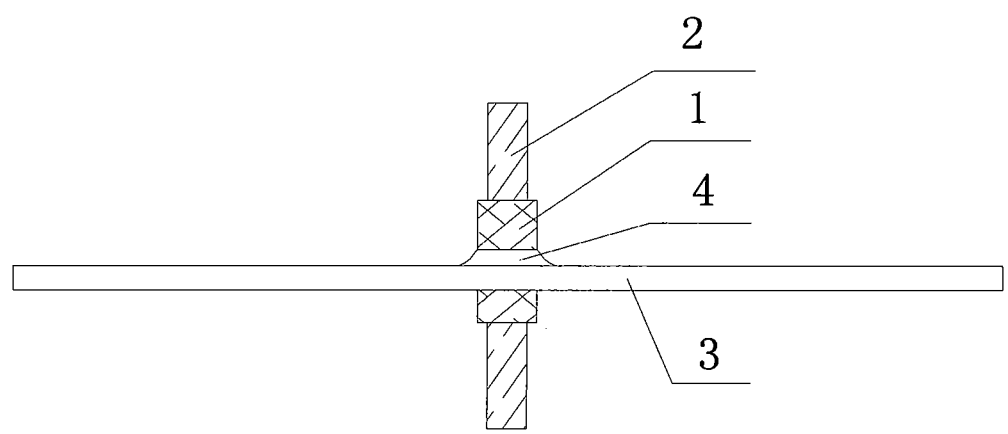
FIG. 1 is a side view 1 of a battery cover plate formed from a composite according to an embodiment of the disclosure.
Figure 2:
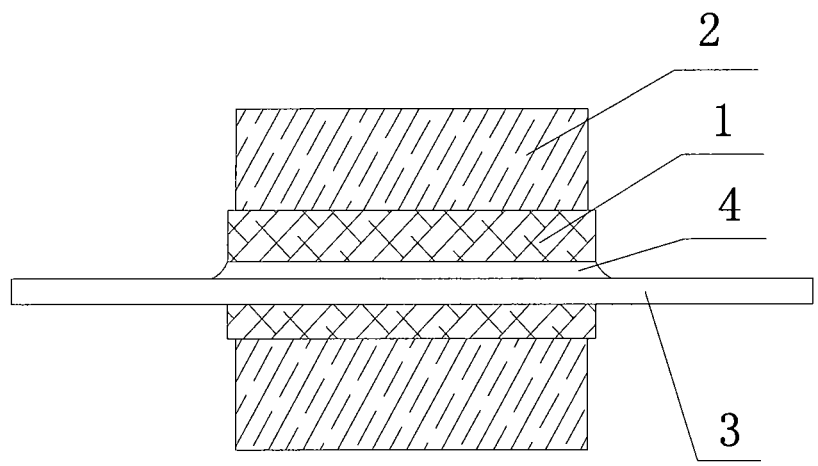
FIG. 2 is a side view 2 of a battery cover plate formed from a composite according to an embodiment of the disclosure.

In the Figures, the number 1 refers to a metal-resin composite. 2 is a metal electrode. 3 is a metal or an alloy. 4 is a component for securing the parts of the cover plate.

DETAILED DESCRIPTION OF THE EMBODIMENT

An embodiment discloses a metal substrate with concavities in the surface, a first coating layer on the surface of the metal substrate, a second coating layer on the first coating layer, and a third coating layer on the second coating layer. The first coating layer fills the concavities and covers the surface of the substrate.

Preferably, the first coating layer comprises a polyphenylene sulfide resin and titanium dioxide particles. The second coating layer comprises a polyphenylene sulfide resin, fluorinated ethylene-propylene, and titanium dioxide particles. The third coating layer comprises an inorganic material, and a polymer. The polymer is selected from polyphenylene sulfide resins, tetrafluoroethene-perfluoroalkyl vinyl ether copolymers, and combinations thereof. Preferably, the inorganic material is selected from the group consisting of glass fibers, carbon fibers, aromatic polyamide fibers, calcium carbonates, magnesium carbonate, silicon dioxide, talcum powder, and combinations thereof.

The concavities in the metal surface can be obtained by an etching process. The etching process may have an influence on the distributions and depths of the concavities in the metal surface, which affect the adhesive strength between the metal substrate and the first coating layer. If the etching time is too long, the diameters and depths of the concavities will be too large, which may affect the smoothness of the first coating layer, the adhesive strength between the first coating layer and the metal substrate, and sealing properties of the composite. On the other hand, if the etching time is too short, the concavities may have an uneven distribution and small depths, which may affect adhesive property of the first coating layer and the metal substrate and the sealing property of the composite. In the embodiments of the disclosure, the etching time varies according to the types of the metal substrates.

According to an embodiment, the first coating layer comprises a polyphenylene sulfide resin and titanium dioxide particles. The weight ratio of the polyphenylene sulfide resin to titanium dioxide is from about (0.2:1) to about (15:1). The titanium dioxide particles have an average diameter of from about 100 to about 1000 μm. Preferably, the titanium dioxide particles have an average particle diameter of from about 200 μm to about 500 μm. To mix the titanium oxide particles and the polyphenylene sulfide resin and avoid the conglobation of titanium dioxide particles, the surface of titanium dioxide particles can be modified to be lipophilic, hydrophilic, or amphipathic. The modification can be achieved by a coupling agent. The coupling agent can be any agents known to those with ordinary skills in the art. For example, the coupling agent can be selected from titanate coupling agents, alkyl silane coupling agents, and aminosilane coupling agents. The coupling agents can be commercially available products, such as KH-550 coupling agent from Nanjing Lipai Chemical Co., Ltd., and KR-12 coupling agent from Kanrich Electronic Corp.

Preferably, the first coating layer has a thickness of from about 0.1 µm to about 2000 µm. In some embodiments, the first coating layer has a depth of from about 10 µm to about 300 µm. In an embodiment, the first coating layer is prepared by coating one time. In other embodiments, the first coating layer is prepared by coating more than one time. In the coating process, an airbrush can be used to apply the coating slurry onto the metal substrate. The operating pressure can be from about 1 atm to about 10 atm. Preferably, the coated metal substrate is calcined at a temperature of from about 300° C. to about 350° C., for a period of time from about 20 minutes to 60 minutes, to form a precast composite. In an embodiment, the temperature is from about 320° C. to about 330° C. Preferably, the coating process is performed under a vacuum. The metal substrate can be calcined one time, or more than one time. In some embodiments, the coating process is performed under an inert gas. The precast composite is cooled down in water. In other embodiments, the precast composite is cooled down in the air.

In the coating process, the polyphenylene sulfide resin melts into a liquid state. The liquid resin can penetrate into the ultrafine concavities in the substrate surface by capillary action. The liquid resin also forms a half cross-link layer on the substrate surface. As a result, the first layer is bonded to the metal substrate closely and covers the surface of the metal substrate. Further, as the first and second layers are both formed from polyphenylene sulfide resin, they can bond with each other closely. Therefore, the difficulty of applying a second polyphenylene sulfide resin layer on the first layer is overcome. Because of the low solidification temperature, if the polyphenylene sulfide resin is directly applied onto a metal substrate, it may rapidly cool down and solidify when it contacts with the metal substrate. Moreover, the rapid solidification also prevents the resin from penetrating into the ultrafine concavities in the substrate surface. As a result, the metal substrate may not be fully sealed, and also may not strongly bond to the coating layer.

Preferably, the second coating layer comprises a polyphenylene sulfide resin, a fluorinated ethylene-propylene copolymer, and titanium dioxide particles. Preferably, an organic solution, water, and a coupling agent are used to prepare the second coating layer. The weight ratio of the polyphenylene sulfide resin, the fluorinated ethylene-propylene copolymer, the titanium dioxide particles, the organic solution, water, and the coupling agent is about (15-0.5):(15-0.5):1:(50-500):(1-10):(0-10). Preferably, the second coating layer comprises an inorganic material. The inorganic material is selected from the group consisting of glass fibers, carbon fibers, aromatic polyamide fibers, calcium carbonate, magnesium carbonate, silicon dioxide, talcum powder, and combinations thereof. In an embodiment, the second coating layer has a thickness of from about 30 µm to 100 µm.

In an embodiment, the weight ratio of the inorganic material to the polyphenylene sulfide resin is from about (4:1) to about (8:1).

According to an embodiment, the third coating layer comprises an inorganic material, and a polymer selecting form the group consisting of polyphenylene sulfide resins, tetrafluoroethene-perfluoroalkyl vinyl ether copolymers, and combinations thereof. The inorganic material is selected from the group consisting of glass fibers, carbon fibers, aromatic polyamide fibers, calcium carbonate, magnesium carbonate, silicon dioxide, talcum powder, and combinations thereof.

In an embodiment, the weight ratio of the inorganic material to the polyphenylene sulfide resin is from about (4:1) to about (8:1).

The metal substrate referred above can be selected from the group consisting of copper, copper alloys, aluminum, aluminum alloys, stainless steel, iron alloys, and combinations thereof.

In some embodiments, a method for preparing a metal-resin composite is disclosed. The method comprises the steps of: etching the surface of a metal substrate; preparing a slurry; applying the slurry on the surface of the metal substrate; calcining the metal substrate to form a first precast composite; preparing a mixture; applying the mixture onto the first precast composite; calcining the first precast composite to form a second composite; applying a polymer selecting from polyphenylene sulfide resins, tetrafluoroethene-perfluoroalkyl vinyl ether copolymers, and combination thereof onto the second composite by an injection molding process to form a metal-resin composite.

Preferably, surface conversion treatments can be performed on the metal substrate. The methods of surface conversion treatments are well-known to those with ordinary skills in the art, such as polishing, grease removal, and other treatments. One object of polishing is to remove the oxidation layer of the metal substrate. The other object is to form ultrafine concavities in the surface of the metal substrate. For example, concavities with a micrometer-size can be prepared by polishing with 150 grit to 400 grit abrasive papers or sandblasting devices. The object of grease removal is to remove grease and metal powders produced during the polishing process. Preferably, acid or alkali aqueous solutions are employed in the etching process. The acid or alkali aqueous solutions are well known to those with ordinary skill in the art, such as hydrochloric acid solutions, sulfuric acid solutions, sodium hydroxide solutions, potassium hydroxide solutions and so on. According to some embodiments, a hydrochloric acid solution with a concentration of from about 0.1 mol/L to about 0.5 mol/L, a sulfuric acid solution, or a nitric acid solution with the same concentration is applied to form uneven concavities with depths of from about 0.2 µm to about 10 µm on the surface of the metal substrate. Referring to the some embodiments, the concavities have an average diameter of from about 2 µm to about 5 µm, and depths of from about 1 µm to about 2 µm. Etching results may be controlled by varying the etching conditions. The optimal distribution and depth may enhance the bonding between the metal substrate and the first layer, and the sealing property of the composite.

Preferably, the slurry for the first layer is prepared by mixing a polyphenylene sulfide resin, an organic solvent, titanium dioxide particles, a coupling agent, and water at a certain ratio. According to an embodiment, weight ratio of the polyphenylene sulfide resin, the organic solvent, titanium dioxide, the coupling agent, and water is about (15-1):(30-100):1:(0-10):(0-10). The polyphenylene sulfide resin, the organic solvent, titanium dioxide particles, the coupling agent, and water are mixed in a container. The mixture is stirred at a speed of from about 100 r/s to about 300 r/s, a period of time from about 1 minute to about 120 minutes. In another embodiment, an ultrasonic wave is applied for about 5 minutes to about 60 minutes to prepare a slurry for the first layer. The organic solvent is well known to those with ordinary skills in the art, such as anhydrous alcohols, 70% industrial ethyl alcohol, acetone, and the like. Preferably, the titanium dioxide particles have an average particle diameter of from about 100 nm to about 1000 nm. In some embodiments, the average particle diameter is from about 200 nm to about 300 nm. The coupling agent can be titanate coupling agents, alkyl silane coupling agents, and aminosilane coupling agents, which can be formed through methods well known to those with ordinary skills in the art, or purchased from vendors.

According to the present embodiment, the first layer has a thickness of from about 10 μm to about 300 μm.

Preferably, the calcining step is performed under a vacuum or an inert gas. Preferably, the vacuum degree is less than 0.01 mPa. The inert gas can be selected from the group consisting of helium, argon, nitrogen, a mixture of hydrogen and nitrogen, other inert gases, and combinations thereof.

According to the present embodiment, the step of calcining the coated metal substrate is performed under a temperature of from about 300° C. to about 350° C., for a period of from about 10 minutes to about 60 minutes. In other embodiments, the calcining of the coated metal substrate is performed under a temperature of from about 320° C. to about 330° C., for a period of from about 20 minutes to about 30 minutes. An extremely high temperature may not favor the formation of the first layer and the bonding with the metal substrate. On the other hand, an extremely low temperature may increase the time of the melted resin spreading on the substrate and the viscosity of the melted resin, which makes it more difficult to penetrate into concavities of the metal substrate. Therefore, the efficiency of the bonding between the first layer and the metal substrate may be decreased. Further, an extremely high temperature or extremely long heating time may increase the surface oxidation of the metal substrate and the cross-link of the first layer. Neither the oxidation of the metal substrate nor the extremely cross-linked polyphenylene sulfide resin is favoring the adhesion between the metal substrate and the first layer.

Preferably, the mixture for the second layer is prepared by mixing and granulating a polyphenylene sulfide resin and an inorganic material at a certain ratio.

According to an embodiment, the second coating layer comprises a fluorinated ethylene-propylene copolymer, titanium particles, an organic solution, water, and a coupling agent. The weight ratio of the fluorinated ethylene-propylene copolymer, the titanium particles, the organic solution, water, and the coupling agent is about (15-0.5):(15-0.5):1:(50-500):(1-10):(0-10).

In an embodiment, an aluminum alloy is used as a metal substrate. First, surface conversion treatments are performed, such as polishing, grease removal, and etching. The polishing and grease removal methods are well known to those with ordinary skills in the art. The etching process comprises the steps of: immersing the metal substrate into a sodium hydroxide solution with a concentration of from about 0.1 mol/L to about 0.5 mol/L for about 30 seconds to about 10 minutes; washing the substrate with running water for from about 1 minute to about 5 minutes; immersing the washed metal substrate in a hydrochloride solution with a concentration of from about 0.1 mol/L to about 0.5 mol/L for about 10 seconds to about 5 minutes; washing the substrate with running water for from about 1 minute to about 5 minutes; optionally immersing the metal substrate in an alcohol solution containing about 0.5% to about 5% by weight of coupling agents for about 1 minute to about 10 minutes; and removing water from the metal substrate under a temperature of about 100° C. to about 150° C. for about 10 minutes to about 60 minutes to provide a pretreated aluminum alloy substrate.

A slurry is prepared. A polyphenylene sulfide resin is mixed with ethanol, titanium dioxide particles. Preferably, a coupling agent and water are added into the mixture. The weight ratio of ethanol, titanium dioxide, coupling agent and water is about (10-40):(50-80):(5-20):(0-5):(0-10). The mixture is stirred in a vessel and dispersed by ultrasonic waves for about 10 minutes to about 30 minutes to provide a slurry.

The slurry with a thickness of from about 20 μm to about 300 μm is coated on the aluminum alloy. The coating may be performed by an airbrush with an operating pressure of from about 1 atm to about 10 atm.

The coated aluminum alloy is first calcined under a temperature of from about 300° C. to about 350° C. under a vacuum or a protective gas for from about 20 minutes to about 60 minutes to prepare a precast metal substrate. Then the precast metal substrate is cooled down in water or air slowly. In some embodiments, the coating is performed one time or more than one time.

A mixture is prepared for the second coating layer. The mixture comprises a fluorinated ethylene-propylene copolymer, titanium particles, an organic solution, water, and a coupling agent. The weight ratio of the fluorinated ethylene-propylene copolymer, the titanium particles, the organic solution, water, and the coupling agent is about (15-0.5):(15-0.5):1:(50-500):(1-10):(0-10).

The precast substrate is coated by the mixture. The coated aluminum alloy is calcined under a temperature of from about 300° C. to about 360° C. under a vacuum or a protective gas for from about 10 minutes to about 60 minutes to prepare a second precast composite.

The second precast composite is coated by a polymer to provide a metal-resin composite by an injection molding process. The polymer is selected from the group consisting of polyphenylene sulfide resins, tetrafluoroethene-perfluoroalkyl vinyl ether copolymers, and combinations thereof.

An embodiment of the present disclosure further provides a battery. The battery comprises a shell, a core displaced in the shell, an electrolyte, and a cover plate. The cover plate closes and seals the shell. The cover plate battery is formed from the composite of the present disclosure.

In an embodiment, there is no gas leakage under a pressure of about 10 atm. The following provides additional details of some embodiments of the present disclosure.

Embodiment 1

The embodiment discloses a metal-resin composite and a method for preparing the same.

An aluminum alloy substrate is cut and pressed to a rectangular shape with a size of 10 cm×2 cm×0.2 mm. The surface of the substrate is polished with a 300 grit abrasive paper for about 2 minutes. The substrate is immersed into ethanol, acetone, or detergent solutions for about 30 minutes. Then the substrate is cleaned with running water. The substrate is immersed into a sodium hydroxide solution with a concentration of about 0.2 mol/L for about 5 minutes. Then the substrate is cleaned with running deionized water. The substrate is immersed into a hydrochloride solution with a concentration of about 0.1 mol/L for about 1 minute. The substrate is washed with running deionized water.

30 g polyphenylene sulfide resin powder (PPS-ha resin powder from Sichuan Deyang chemical Co., Ltd), 7 g titanium dioxide particles, 60 g ethanol, and 3 g deionized water are mixed and dispersed by an ultrasonic device to provide a slurry.

The slurry is coated onto the substrate by a spray gun with a nozzle diameter of about 0.3 mm. The coating process is performed one time under a pressure of about 2 atm, to form a metal substrate with a slurry with a thickness of about 200 μm.

The coated metal substrate is calcined at a temperature of about 330° C. and an atmosphere of argon for about 25 minutes. The calcined metal substrate is quenched in water to form a precast composite.

10 g polyphenylene sulfide resin powder (PPS-ha resin powder from Sichuan Deyang chemical Co., Ltd), 5 g fluorinated ethylene-propylene copolymer, 100 g organic solution, 1 g titanium powders, 0 g water and 0 g coupling agents are mixed and dispersed by an ultrasonic device to provide a mixture.

The mixture is coated onto the precast metal substrate by a spray gun with a nozzle diameter of about 0.3 mm, under a pressure of about 2 atm, to form a layer with a thickness of about 200 μm. Then the coated precast composite is calcined in an atmosphere furnace (KBF16Q-I, Nanjing University Instruments) under a temperature of about 320° C. for about 25 minutes to prepare a second precast composite.

The second precast composite is placed in an injection molding machine. Polyphenylene sulfide resins are injected into the machine having a temperature of about 135° C., under the temperature of about 330° C. to form a metal-resin composite, labeled as T1.

Embodiment 2

The embodiment discloses a metal-resin composite and a method for preparing the same.

An aluminum alloy substrate is cut and pressed to a rectangular shape with a size of 10 cm×2 cm×0.2 mm. The surface of the substrate is polished with a 300 grit abrasive paper for about 2 minutes. The substrate is immersed into ethanol, acetone, or detergent solutions for about 30 minutes. Then the substrate is cleaned with running water. The substrate is immersed into a sodium hydroxide solution with a concentration of about 0.2 mol/L for about 5 minutes. Then the substrate is cleaned with running deionized water. The substrate is immersed into a hydrochloride solution with a concentration of about 0.1 mol/L for about 1 minute. The substrate is washed with running deionized water.

30 g polyphenylene sulfide resin powder (PPS-ha resin powder from Sichuan Deyang chemical Co., Ltd), 7 g titanium dioxide particles, 60 g ethanol, and 3 g deionized water are mixed and dispersed by an ultrasonic device to provide a slurry.

The slurry is coated onto the substrate by a spray gun with a nozzle diameter of about 0.3 mm. The coating process is performed one time under a pressure of about 2 atm, to form a metal substrate with a slurry with a thickness of about 200 μm.

The coated metal substrate is calcined at a temperature of about 330° C. and an atmosphere of nitrogen for about 25 minutes. The calcined metal substrate is quenched in water to form a precast metal substrate.

5 g polyphenylene sulfide resin powder (PPS-ha resin powder from Sichuan Deyang chemical Co., Ltd), 15 g fluorinated ethylene-propylene copolymer, 200 g ethanol, 1 g titanium particles, 1 g water and 1 g JH-A110 coupling agent are mixed and dispersed by an ultrasonic device to provide a mixture.

The mixture is coated onto the precast metal substrate by a spray gun with a nozzle diameter of about 0.3 mm, under a pressure of about 2 atm, to form a layer with a thickness of about 200 μm. Then the substrate is calcined in an atmosphere furnace (KBF16Q-I from Nanjing University Instruments) under a temperature of about 330° C. for about 20 minutes to prepare a second precast composite.

The second precast composite is placed in an injection molding machine and polyphenylene sulfide resins are injected into the machine having a temperature of about 135° C., under the temperature of about 340° C. to form a metal-resin composite, labeled as T2.

Embodiment 3

The embodiment discloses a metal-resin composite and a method for preparing the same.

A copper substrate is cut into a rectangular substrate with a size of 10 cm×2 cm×0.2 mm. The surface is polished with a 150 grit abrasive paper for about 2 minutes. The substrate is immersed into ethanol, acetone or detergent solutions for about 30 minutes. Then the substrate is cleaned with running water. The substrate is immersed into a sodium persulfate solution with a weight concentration of about 25% for about 3 minutes. Then the substrate is cleaned with running deionized water. The substrate is dried in the air.

About 30 g of polyphenylene sulfide resin powder (PPS-ha resin powder from Sichuan Deyang chemical Co., Ltd), 7 g of titanium dioxide, 60 g of ethanol, and 3 g deionized water are mixed and dispersed by an ultrasonic machine to form a slurry.

The slurry is sprayed onto the metal substrate by a spray gun with a nozzle diameter of about 0.3 mm. The coating process is performed by more than one time under a pressure of about 2 atm, to form a coating layer of a thickness of about 200 μm.

The metal substrate is calcined at a temperature of about 330° C. and an atmosphere of argon for about 25 minutes. The substrate is quenched in water to provide a precast metal substrate.

15 g polyphenylene sulfide resin powder (PPS-ha resin powder from Sichuan Deyang chemical Co., Ltd), 15 g fluorinated ethylene-propylene copolymer, 350 g 95% ethanol, and 5 g titanium powders are mixed and dispersed by an ultrasonic device to provide a mixture.

The mixture is coated onto the precast metal substrate by a spray gun with a nozzle diameter of about 0.3 mm, under a pressure of about 2 atm, to form a layer with a thickness of about 200 μm, then calcined in a atmosphere furnace (KBF16Q-I available from Nanjing University Instruments) under a temperature of about 340° C. for about 20 minutes to prepare a second precast composite.

The second precast composite is placed in an injection molding machine and polyphenylene sulfide resins are injected into the machine under the temperature of about 350° C. to form a metal-resin composite, labeled as T3.

Comparative Embodiment 1

The Comparison Embodiment is substantially similar in all aspects to that of a reference patent with a publication number CN171170A. The composite of the same size as the reference is labeled TC1.

Testing

Tensile Testing

A tensile testing machine (Sans Testing Machine Inc.) is applied to test the tensile and air tightness of T1 to TC1. The testing results are shown in Table 1.

Sealing Testing

High pressure air is applied from one end to the other end of the battery. The pressure starts from 0. A foaming agent is applied at the position where the metal substrate contacts with the first coating layer. Therefore, if the metal-resin composite cannot meet requirements of sealing, gases would be released from the contacting position between the metal substrate and the first layer, foams would be generated. When foaming occurs, the value of pressure is recorded and the detailed testing results are shown in Table 1.

TABLE 1

| Samples | Tensile Strength/MPa | Maximum Pressure Without Air Releasing |
|---|---|---|
| T1 | 25 | 8 atm |
| T2 | 27 | 10 atm |
| T3 | 25 | 10 atm |
| TC1 | 16 | <0.1 atm |

As shown in Table 1, gas releasing may not happen to T2 under a pressure of 10 atm, while the TC1 may release gases in the pressure of 0.1 atm. Further, T2 has a tensile strength of 27 MPa, while TC1 has a tensile strength of 16 MPa.

Many modifications and other embodiments of the present disclosure will come to mind to one skilled in the art to which the present disclosure pertains having the benefit of the teachings presented in the foregoing description. It will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A metal-resin composite comprising:
a metal substrate having concavities in the surface;
a first coating layer on the surface of the metal substrate;
wherein the first coating layer fills concavities and covers the surface of the substrate; and the first coating layer comprises a polyphenylene sulfide resin and titanium dioxide particles;
a second coating layer on the first coating layer;
wherein the second coating layer comprises a polyphenylene sulfide resin, a fluorinated ethylene-propylene copolymer, and titanium dioxide particles; and
a third coating layer on the second coating layer;
wherein the third coating layer comprises an inorganic material, and a polymer selected from the group consisting of polyphenylene sulfide resins, tetrafluoroethene-perfluoroalkyl vinyl ether copolymers, and combinations thereof.

2. The composite of claim 1, wherein the concavities have depths of from about 0.2 μm to about 10 μm.

3. The composite of claim 1, wherein the first coating layer has a thickness of from about 10 μm to about 300 μm.

4. The composite of claim 1, wherein the second coating layer has a thickness of from about 30 μm to about 100 μm.

5. The composite of claim 1, wherein the titanium dioxide particles in the first coating layer and the second coating layer have an average diameter of from about 200 μm to about 500 μm.

6. The composite of claim 1, wherein the weight ratio of the polyphenylene sulfide resin to the fluorinated ethylene-propylene copolymer to titanium dioxide particles is about (15-0.5) : (15-0.5): 1.

7. The composite of claim 1, wherein the inorganic material in the third coating layer is selected from the group consisting of glass fibers, carbon fibers, aromatic polyamide fibers, calcium carbonate, magnesium carbonate, silicon dioxide, talcum powder, and combinations thereof.

8. The composite of claim 1, wherein the weight ratio of the inorganic material to the polymer in the third coating layer is from about (4:1) to about (8:1).

9. The composite of claim 1, wherein the metal substrate is selected from the group consisting of copper, copper alloys, aluminum, aluminum alloys, stainless steel, iron alloys, and combinations thereof.

10. A method for preparing a metal-resin composite, comprising:
etching the surface of a metal substrate;
preparing a slurry, wherein the slurry comprises a polyphenylene sulfide resin and titanium dioxide particles;
applying the slurry on the surface of the metal substrate;
calcining the metal substrate to form a first precast composite;
preparing a mixture, wherein the mixture comprises a polyphenylene sulfide resin, a fluorinated ethylene-propylene copolymer, and titanium dioxide particles;
applying the mixture onto the precast composite;
calcining the first precast composite to form a second precast composite; and
applying a polymer comprising an inorganic material onto the second precast composite by an injection molding process to form a metal-resin composite;
wherein the polymer is selected from the group consisting of polyphenylene sulfide resins, tetrafluoroethene-perfluoroalkyl vinyl ether copolymers, and combinations thereof.

11. The method of claim 10, wherein the slurry further comprises, an organic solvent, a coupling agent, and water.

12. The method of claim 10, wherein at least one of the calcining steps is carried out in the presence of an inert gas.

13. The method of claim 12, wherein the inert gas is selected from the group consisting helium, argon, nitrogen, a mixture of nitrogen and hydrogen, and combinations thereof.

14. The method of claim 10, wherein the calcining of the metal substrate step is performed under a temperature of from about 300° C. to 350° C. for about 10 minutes to 60 minutes.

15. The method of claim 13, wherein the calcining of the first precast composite step is performed at a temperature of from about 300° C. to 360° C. for about 10 minutes to 60 minutes.

16. The method of claim 10, wherein the mixture further comprises an organic solution, an inorganic material, a coupling agent, and water.

17. A battery comprising:
a shell;
a core displaced in the shell;
an electrolyte; and
a cover plate closing the shell;
wherein the cover plate comprising:
a metal substrate having concavities in the surface;
a first coating layer on the surface of the metal substrate;
wherein the first coating layer fills concavities and covers the surface of the substrate; and the first coating layer comprises a polyphenylene sulfide resin and titanium dioxide particles;
a second coating layer on the first layer,
wherein the second coating layer comprises a polyphenylene sulfide resin, a fluorinated ethylene-propylene copolymer, and titanium dioxide particles; and
a third coating layer on the second layer,
wherein the third coating layer comprises an inorganic material, and a polymer selected from the group consisting of polyphenylene sulfide resins, tetrafluoroethene-perfluoroalkyl vinyl ether copolymers, and combinations thereof.

* * * * *